(12) United States Patent
Larsson et al.

(10) Patent No.: US 10,616,029 B2
(45) Date of Patent: *Apr. 7, 2020

(54) SIGNALING OF MODULATION CONFIGURATION

(71) Applicant: Telefonaktiebolaget LM Ericsson (publ), Stockholm (SE)

(72) Inventors: Daniel Larsson, Stockholm (SE); Yu Yang, Solna (SE)

(73) Assignee: Telefonaktiebolaget LM Ericsson (Publ) (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/214,721

(22) Filed: Dec. 10, 2018

(65) Prior Publication Data

US 2019/0109751 A1 Apr. 11, 2019

Related U.S. Application Data

(63) Continuation of application No. 15/447,941, filed on Mar. 2, 2017, which is a continuation of application No. 14/771,716, filed as application No. PCT/SE2015/050835 on Jul. 28, 2015, now Pat. No. 9,621,397.

(60) Provisional application No. 62/030,239, filed on Jul. 29, 2014.

(51) Int. Cl.
*H04L 27/34* (2006.01)
*H04L 1/00* (2006.01)
*H04L 27/00* (2006.01)

(52) U.S. Cl.
CPC ............ *H04L 27/34* (2013.01); *H04L 1/0002* (2013.01); *H04L 1/0003* (2013.01); *H04L 1/0016* (2013.01); *H04L 27/0008* (2013.01)

(58) Field of Classification Search
CPC ... H04L 1/0003; H04L 1/0009; H04L 1/0026; H04L 1/0631; H04B 7/0632; H04B 17/382; H04W 88/02; H04W 72/1278
See application file for complete search history.

(56) References Cited

U.S. PATENT DOCUMENTS

| | | | |
|---|---|---|---|
| 9,698,960 B2 * | 7/2017 | Kim | H04L 5/0092 |
| 2009/0116589 A1 | 5/2009 | Zhang et al. | |
| 2012/0044894 A1 | 2/2012 | Ko et al. | |

(Continued)

FOREIGN PATENT DOCUMENTS

| | | |
|---|---|---|
| CA | 2931649 A1 | 7/2015 |
| CN | 103297181 A | 9/2013 |

(Continued)

OTHER PUBLICATIONS

Chinese Office Action and English Translation dated May 31, 2019 for Application No. 201580047715.5, consisting of 11-pages.

(Continued)

*Primary Examiner* — Khanh C Tran

(74) *Attorney, Agent, or Firm* — Christopher & Weisberg, P.A.

(57) ABSTRACT

The present disclosure pertains to a terminal for a wireless network, the terminal being adapted to receive a control message. The terminal further is adapted to read from one of a set of alternative tables based on the control message, and to perform modulation configuration based on information read from the table.

12 Claims, 3 Drawing Sheets

(56) References Cited

U.S. PATENT DOCUMENTS

| | | | |
|---|---|---|---|
| 2012/0314678 A1 | 12/2012 | Ko et al. | |
| 2013/0258955 A1* | 10/2013 | Baik | H04W 72/04 370/329 |
| 2014/0169297 A1* | 6/2014 | Kim | H04L 5/0092 370/329 |
| 2014/0192732 A1 | 7/2014 | Chen et al. | |
| 2015/0003268 A1 | 1/2015 | Wang et al. | |
| 2015/0085767 A1 | 3/2015 | Einhaus et al. | |
| 2015/0195069 A1 | 7/2015 | Yi et al. | |
| 2015/0312071 A1 | 10/2015 | Chen et al. | |
| 2015/0358111 A1 | 12/2015 | Marinier et al. | |
| 2015/0381310 A1 | 12/2015 | Hammarwall et al. | |
| 2016/0337023 A1 | 11/2016 | Yi et al. | |
| 2017/0012735 A1 | 1/2017 | Yang et al. | |

FOREIGN PATENT DOCUMENTS

| | | |
|---|---|---|
| CN | 103580788 A | 2/2014 |
| CN | 103746776 A | 4/2014 |
| CN | 103944855 A | 7/2014 |
| GB | 2500254 A | 9/2013 |
| RU | 2300847 C2 | 6/2007 |
| WO | 2004064337 A1 | 7/2004 |
| WO | 2013127303 A1 | 9/2013 |
| WO | 2013135475 A1 | 9/2013 |
| WO | 2014059831 A1 | 4/2014 |
| WO | 2014109915 A1 | 7/2014 |

OTHER PUBLICATIONS

International Search Report and Written Opinion dated Oct. 15, 2015 for International Application Serial No. PCT/SE2015/050835, International Filing Date: Jul. 28, 2015 consisting of 10-pages.

3GPP_TS_36 211_V11 2 0_(Feb. 2013) 3rd Generation Partnership Project; Technical Specification Group Radio Access Network; Evolved Universal Terrestrial Radio Access (E-UTRA); Physical Channels and Modulation (Release 11) Mar. 15, 2013 consisting of 109-pages.

3GPP TS 36.213 V11.2.0 (Feb. 2013) 3rd Generation Partnership Project; Technical Specification Group Radio Access Network; Evolved Universal Terrestrial Radio Access (E-UTRA); Physical layer procedures (Release 11) Mar. 15, 2013 consisting of 173-pages.

3GPP TSG RAN WG1 Meeting #72bis, R1-131328, Chicago, Ill, USA; Source: Panasonic, Title: "Discussion on 256QAM for Downlink in Small Cell Deployments", Agenda Item 7.2.5.2.3, Document for Discussion, XP050697188, 3rd Generation Partnership Project (3GPP), Mobile Competence Centre; 650, Route Des Lucioles; F-06921 Sophia-Antipolis Cedex; France, Apr. 15-19, 2013 consisting of 6-pages.

First Examination Report dated Jul. 4, 2017 issued in corresponding New Zealand Patent Application; IP No. 728691, consisting of 3-pages.

Russian Office Action and English Translation dated Nov. 13, 2017 to Russian Patent Application No. 2014106149, consisting of 12-pages.

Canadian Office Action dated Nov. 28, 2017 for Canadian Patent Application No. 2,956,559, consisting of 4-pages.

Moroccan Examination Report and Translation dated May 31, 2017 for Moroccan Patent Application No. 39759, Filed on Jul. 28, 2015, consisting of 6-pages.

Japanese Notification of Reasons for Refusal and Translation dated Apr. 17, 2018 for Japanese Patent Application No. 2017-504744, consisting of 6-pages.

* cited by examiner

SIGNALING OF MODULATION CONFIGURATION

CROSS-REFERENCE TO RELATED APPLICATION

This application is a continuation of U.S. application Ser. No. 15/447,941, filed Mar. 2, 2017, entitled SIGNALING OF MODULATION CONFIGURATION, and is a continuation of U.S. patent application Ser. No. 14/771,716, filed Aug. 31, 2015, which is a U.S. National Stage Application of, and claims priority to, Patent Cooperation Treaty Application No. PCT/SE2015/050835, filed Jul. 28, 2015, and also claims priority to U.S. Provisional Patent Application No. 62/030,239, filed Jul. 29, 2014, entitled SIGNALING OF 256QAM CONFIGURATION and the entireties of all of which are incorporated herein by reference.

TECHNICAL FIELD

The present disclosure pertains to methods and apparatus involved in modulation configuration in wireless communication networks, in particular regarding 256QAM signaling.

BACKGROUND

In 3GPP Rel-12, 256QAM is introduced as a new modulation scheme in the downlink to increase the data rate for small cells. To support 256QAM, a new Rel-12 CQI table and a new Rel-12 MCS table including 256QAM entries may be used. The Rel-8 legacy CQI and MCS table may be used if 256QAM support is not required. Therefore, there is a need to signal the configuration of two sets of tables, i.e. Rel-12 CQI and MCS table or Rel-8 CQI and MCS table, between a base station or eNB and one or more terminals or UEs, which may comprise a first set of alternative tables. Similar signaling may be needed in other contexts, e.g. if new modulation-related tables are introduced and/or to cover a sufficiently large number of possible modulation configurations.

SUMMARY

In the following, solutions for 256QAM table configuration signaling are proposed, which may be considered pertaining to modulation configuration signaling. The solutions generally may be implemented by a base station adapted to send a control message like a RRC message and/or a terminal or UE (user equipment) adapted to receive a control message, in particular a RRC message, and/or to configure its modulation configuration based on and/or according to the control message or RRC message and/or information provided in the control message or RRC message.

The information and/or the control message may comprise parameters as disclosed herein, e.g. table indication parameters. The suggested approaches allow providing a large number of possible modulation configurations (and/or increasing the number) with a limited amount of signaling, and in particular in the context of LTE allow easy extension of modulation-related tables with a low amount of changes required to the standard and systems, while upholding legacy functionality.

There is disclosed a terminal for a wireless network, the terminal being adapted to receive a control message. The terminal further is adapted to read from one of a set of alternative tables based on the control message, and is further adapted to perform modulation configuration based on information read from the table.

Alternatively or additionally, there is suggested a method for a terminal for a wireless network. The method comprising receiving a control message and reading from one of a set of alternative tables based on the control message, as well as performing modulation configuration based on information read from the table.

In addition, there is disclosed a base station for a wireless network. The base station is adapted to determine a control message and further is adapted to transmit the control message to a terminal. The control message comprises information indicating a table of a set of alternative tables to be used.

A method for a base station for a wireless network is also proposed. The method comprises determining a control message and transmitting the control message to a terminal. The control message comprises information indicating a table of a set of alternative tables to be used.

DETAILED DESCRIPTION

Figure 1:
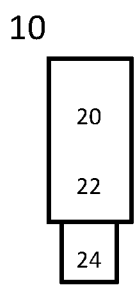
FIG. 1 schematically shows a user equipment or terminal.

A terminal and/or base station may generally be part of a system and/or form a system, in particular a system for wireless communication. Base station and/or terminal may be adapted according to and/or to follow at least one wireless communication standard, in particular an LTE standard.

In LTE systems up to Rel-11, the set of modulation scheme for both downlink and uplink includes QPSK, 16QAM and 64QAM, corresponding to 2, 4 and 6 bits per modulation symbol respectively. In LTE evolution, especially for the scenarios with high SINR (Signal to Interference and Noise Ratio), e.g. in small cell environments with terminals close to the serving eNB, a means to provide higher data rate with given transmission bandwidth is the use of higher order modulation that allows for more bits of information to be carried per modulation symbol. For example, with the introduction of 256QAM, 8 bits are transmitted per modulation symbol, which can improve the peak data rate maximum by 33%. It is also noted that 256QAM may only provide gains when the SINR is sufficiently high in certain scenarios.

In practice, the performance of 256QAM is highly sensitive to interference and/or transmitter EVM (Error vector magnitude) and receiver impairments. In 3GPP, 256QAM has been studied mainly under the umbrella of small cell enhancements. To support 256QAM, the standard may be adapted regarding CQI/MCS/TBS table design, configuration signaling and UE category handling.

A Rel-12 CQI table and Rel-12 MCS table are introduced in 3GPP to support 256QAM, as shown in Table and Table 2. Rel-8 CQI table and MCS table can be found in 3GPP TS 36.213 Table 7.2.3-1 and Table 7.1.7.1-1, respectively.

In order to support 256QAM, Rel-12 CQI and MCS table may cover a larger SNR or SINR range comparing to Rel-8 tables. The CQI/MCS index granularity may be increased in the new table, which may affect the link adaptation performance. The Rel-12 CQI and MCS table may coexist with legacy Rel-8 tables, and in particular may form sets of alternative tables. A base station or eNB may be adapted to determine or decide and/or configure which set of tables to be used based on current channel condition, UE capability and other operative conditions.

Regarding the table configuration, there may be followed the approach:

For TM10, CQI tables are common for all CSI processes and/or Rel-11 subframe measurement sets and the MCS table is common for all CQI sets. In this case, a first set of alternative tables for MCS and a second set of alternative tables for CQI and/or all measurement subframe sets may be sufficient For TM1-9, 256QAM a CQI table may be configured per each Rel-11 subframe measurement set. In this case, first, second and third sets of alternative tables or second or third table accesses to a second table may be useful.

The CQI and MCS table configuration may be informed and/or transmitted, by the base station or eNodeB, to one or more UEs via a control message, in particular RRC message signaling.

TABLE 1

Rel-12 256QAM CQI Table

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 2

Rel-12 256QAM MCS Table

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 6 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | Reserved |
| 29 | 4 | |
| 30 | 6 | |
| 31 | 8 | |

There may be provided, for example for or by a given RAT (Radio Access Technology, e.g. LTE/E-Utran) a control layer between or in a base station and one or more terminals, e.g. a RRC (Radio Resource Control) protocol layer, which may exist between or in one or more UEs and an associated eNB, in particular for LTE/E-Utran, and handles the control plane signaling of high layers between UE and eNB. The control layer generally may be adapted and/or used for connection establishment/release, system information broadcast, radio bearer establishment/reconfiguration/release, mobility procedure, paging notification/release and so on.

In particular, the control layer, e.g. RRC, may be adapted and/or used for signaling modulation table configuration, in particular modulation table configuration for 256QAM, which may be referred to as 256QAM table configuration. A control message may comprise corresponding parameters, in particular table indication parameters and/or indices associated to respective tables for modulation configuration.

Modulation configuration signaling, in particular for 256QAM table configuration, may be provided with numerous options. From a standardization point of view, it may be advantageous to not have too much configurability options. Also, a significant effort may be involved if a large amount of different combinations need to tested, which could make the efforts too high if too much configurability options are to be standardized.

One possible approach for is shown in Table 3. With this approach, 3 RRC parameters are added to the list of possible RRC parameters in the specification for 256QAM table configuration. The first parameter "MCS/CQI table configuration for serving cell c" is used for configuring the MCS/CQI table in general. The second and third parameters are used for CQI table configuration when measurement subframe sets are configured for TM1-9. With this approach, when measurement subframe sets are configured for TM1-9, the MCS table needs to be signaled to UE using the first parameter. Therefore, 3 parameters need to be signaled. In addition, it has a limitation that two measurement subframe set should use the same MCS table.

It may be considered to separate the configurability of MCS and CQI table. This approach will introduce even more RRC parameters.

TABLE 3

An example of RRC configuration of CQI/MCS table

| Parameter name in specification | Parameter name in text | Description |
|---|---|---|
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM. In TM1-9, the 256QAM CQI table for each subframe set is configured by parameter "CQI table configuration for csi-MeasSubframeSetx-r10 of serving cell c" instead if Rel-11 subframe set is configured. |
| CQI table configuration for csi-MeasSubframeSet1-r10 of serving cell c | CQI table configuration for csi-MeasSubframeSet1-r10 of serving cell c | For csi-MeasSubframeSet1-r10 of serving cell c, when TM1-9 is configured, configures which CQI table is used between (7.1.7.1-1: Modulation and TBS index table for PDSCH, 7.2.3-1: 4-bit CQI Table) and the CQI tables for 256QAM. |
| CQI table configuration for csi-MeasSubframeSet2-r10 of serving cell c | CQI table configuration for csi-MeasSubframeSet2-r10 of serving cell c | For csi-MeasSubframeSet2-r10 of serving cell c, when TM1-9 is configured, configures which CQI table is used between (7.1.7.1-1: Modulation and TBS index table for PDSCH, 7.2.3-1: 4-bit CQI Table) and the CQI tables for 256QAM. |

Control message parameters, e.g., RRC parameters, and signaling to support for example the 256QAM CQI and MCS table configuration are proposed, aiming at using as few control message or RRC parameters as possible.

There is disclosed a terminal for a wireless network, the terminal may be adapted to, and/or comprise a corresponding unit adapted to, receive a control message, e.g. from a network and/or base station, which may be an eNodeB. The terminal further may further be adapted to, and/or may comprise a corresponding unit adapted to, read from one of a set of alternative tables based on the control message.

Furthermore, the terminal may be adapted to, and/or comprise a corresponding unit adapted to, perform modulation configuration and/or modulation based on information read from the table. This keeps the size of tables limited and in particular allows keeping an already defined (e.g. by a standard like LTE) table unchanged, while introducing new possibilities for modulation with an alternative table.

The set of alternative tables may generally refer to different modulation schemes, wherein each table may refer to different modulation schemes and/or different tables of a set may have differences pertaining to their modulation schemes. One of the schemes may be the scheme to be used, e.g. by the terminal, in particular for performing modulation configuration and/or modulation.

It may be considered that the control message comprises a parameter configuring a MCS table for both of two measurement subframe sets and at the same time configuring a CQI table for one of the measurement subframe set. Information read from the table may comprise and/or indicate a modulation configuration and/or modulation scheme to be used.

The terminal may generally be adapted for operating with a 256QAM MCS table, if a first or second measurement set is configured with a 256QAM CQI table. Accordingly, 256QAM may be easily introduced e.g. into LTE and with a very limited amount of required signaling to configure a terminal accordingly.

Moreover, there is disclosed a method for a terminal for a wireless network. The terminal may be a terminal as described herein. The method may comprise receiving a control message as well as reading from one of a set of alternative tables based on the control message. The method may further comprise performing modulation configuration based on information read from the table and/or modulation based on information read from the table.

The set of alternative tables may generally refer to different modulation schemes, wherein each table may refer to different modulation schemes and/or different tables of a set may have differences pertaining to their modulation schemes. One of the schemes may be the scheme to be used, e.g. by the terminal, in particular for performing modulation configuration and/or modulation.

It may be considered that the control message comprises a parameter configuring a MCS table for both of two measurement subframe sets and at the same time configuring a CQI table for one of the measurement subframe set. Information read from the table may comprise and/or indicate a modulation configuration and/or modulation scheme to be used.

The method may further comprise operating with a 256QAM MCS table, if a first or second measurement set is configured with a 256QAM CQI table.

A base station for a wireless network is disclosed, wherein the base station may be adapted to, and/or comprise a corresponding unit adapted to, determine a control message. The base station further may be adapted to, and/or comprise a corresponding unit adapted to, transmit the control message to a terminal. The terminal may be any of the terminals disclosed herein. The control message may comprise information indicating a table of a set of alternative tables to be used, e.g. by the terminal, in particular for performing modulation configuration and/or modulation.

The set of alternative tables may generally refer to different modulation schemes, wherein each table may refer to different modulation schemes and/or different tables of a set may have differences pertaining to their modulation schemes. One of the schemes may be the scheme to be used, e.g. by the terminal, in particular for performing modulation configuration and/or modulation.

It may be considered that the control message comprises a parameter configuring a MCS table for both of two measurement subframe sets and at the same time configuring a CQI table for one of the measurement subframe set. Information read from the table may comprise and/or indicate a modulation configuration and/or modulation scheme to be used.

The control message may be adapted to configure the terminal for operating with a 256QAM MCS table, if a first or second measurement set is configured with a 256QAM CQI table.

Moreover, there is described a method for a base station for a wireless network. The base station may be any of the base stations described herein. The method may comprise determining a control message and transmitting the control message to a terminal. The control message may comprise information indicating a table of a set of alternative tables to be used, e.g. by the terminal, in particular for performing modulation configuration and/or modulation.

The set of alternative tables may generally refer to different modulation schemes, wherein each table may refer to different modulation schemes and/or different tables of a set may have differences pertaining to their modulation schemes. One of the schemes may be the scheme to be used, e.g. by the terminal, in particular for performing modulation configuration and/or modulation.

It may be considered that the control message comprises a parameter configuring a MCS table for both of two measurement subframe sets and at the same time configuring a CQI table for one of the measurement subframe set. Information read from the table may comprise and/or indicate a modulation configuration and/or modulation scheme to be used.

The control message may be adapted for configuring the terminal for operating with a 256QAM MCS table, if a first or second measurement set is configured with a 256QAM CQI table.

Generally, the control message may comprise one parameter, which may be a single or common or specific parameter, for configuring the terminal for operating with a 256QAM MCS table and at the same time configuring one of the first or second measurement sets in the context of 256QAM CQI discussed herein.

In some variants, the non-limiting term UE or terminal is used. The UE or terminal herein can be any type of wireless device or terminal capable of communicating with a network node or another UE over radio signals, in particular an end-user device. The UE may also be radio communication device, target device, device to device (D2D) UE, machine type UE or UE capable of machine to machine communication (M2M), a sensor equipped with UE and/or radio communication capabilities, iPAD, Tablet, mobile terminals, smart phone, laptop embedded equipped (LEE), laptop mounted equipment (LME), USB dongles, Customer Premises Equipment (CPE) etc. Any device providing a terminal-like functionality or impression to another network node, which may generally be a terminal and/or a base station, may be considered as a terminal or UE. This may for example be the case for a relay node, which may provide a terminal-like behavior. A UE or terminal may be adapted to comply with an LTE standard.

In the context of this disclosure, the term eNB or base station may be used. A base station or eNB may be any kind of network node, which may be adapted to communicate with a UE or terminal, in particular via a wireless connection and/or radio connection. Such a base station or eNB may refer to or comprise a base station, radio base station, evolved Node B (eNB), Node B, relay node, access point, radio access point, Remote Radio Unit (RRU), Remote Radio Head (RRH) etc. In particular, a base station may be any device adapted to transmit a control message, e.g., a RRC message, to a terminal or UE. An eNB may be considered as a specific example of a base station. An eNB may be adapted to comply with an LTE standard.

The embodiments are described by considering LTE. However the embodiments are applicable to any RAT or multi-RAT systems, where the UE regularly assess the serving cell performance by the virtue of RLM procedure (or equivalent procedures) e.g. LTE FDD/TDD, WCDMA/HSPA, GSM/GERAN, Wi Fi, CDMA2000 etc. It should be noted that LTE or LTE-Advanced terminology may sometimes be used throughout this description, however the concepts described herein are not limited to LTE or LTE-Advanced. Rather, the concepts disclosed herein are applicable to any suitable type of cellular communications network, which may comprise one or more terminals and/or one or more base stations.

The embodiments are described for a single carrier (aka single carrier operation of the UE) in a network node. However the embodiments are applicable for multi-carrier or carrier aggregation operation i.e. when network node transmits plurality of carriers to the same or different UEs. The embodiments shall apply to each carrier in this case.

In the following, configuring a table may refer to indicating which table to use.

The embodiments are described only for 256QAM. However, any higher order modulation schemes which require new tables are applicable. In the embodiments, the configurable tables are, but not limited to, CQI table and MCS table. The table number mention below refers to 3GPP TS36.213.

It is suggested to define 3 control message or RRC parameters, as shown e.g. in Table 4, wherein the number of parameters actually used depends on the situation. When the UE is using TM10 or TM1-9 configured without CSI measurement subframe set, the first parameter in the table (i.e. MCS/CQI table configuration for serving cell c), representing a first table indication parameter, indicates whether or not the UE is intended to use CSI and MCS table for 256QAM for a specific set of DCI formats, RNTIs and search spaces on (E)PDCCH and/or indicates which corresponding table to use.

However, when measurement subframe set is configured for TM1-9, the CQI table for each subframe set is configured by the second and third table indication parameters "CQI table configuration for csi-MeasSubframeSetx-r10 of serving cell c" and Rel-12 256QAM MCS table shall be used when Rel-12 256QAM CQI table is configured for any of the subframe sets, which may be considered to provide a predetermined default.

To clarify this further in case either the first or second measurement set is configured with the 256QAM CQI table, the UE will operate with the 256QAM MCS table for a given set of DCI formats, RNTIs and search spaces on (E)PDCCH for all subframe sets. The DCI formats using 256QAM may be limited to only DCI formats 1, 1b, 1d, 2, 2a, 2b, 2c, 2d and only when these are scrambled with the C-RNTI. It is further given that in case there are more than two measurement sets the same approach can be operated as well. In this example, all the 3 parameters are defined as OPTIONAL.

Only the second and third parameters may be signaled when measurement subframe set is configured in TM1-9, and only the first parameter may be signaled for the other cases. Accordingly, the number of table indication parameters is variable and may be one or two. This alternative is captured in Table 5.

An alternative version of embodiment 1 is that when the UE is using TM10 or TM1-9 configured without CSI measurement subframe set, the first parameter in the table (i.e. MCS/CQI table configuration for serving cell c) gives whether or not the UE is using CSI and MCS table for 256QAM for a specific set of DCI formats, RNTIs and search spaces on (E)PDCCH.

If the UE is configured with measurement subframe sets for TM1-9, the parameter in the first row only gives which MCS table that should be used for both measurement subframe sets. It is then further possible to configure for each measurement subframe set separately which CQI table that should be used i.e. either the legacy CQI table or the CQI table considering 256QAM usage. In this example, the three parameters are signaled when measurement subframe set is configured in TM1-9, and only the first parameter is signaled for the other cases. This alternative is captured in Table 4.

TABLE 4

Embodiment 1 RRC configuration parameters (alternative 2)

| Parameter name in specification | Parameter name in text | Description |
| --- | --- | --- |
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM for TM10 and TM1-9 when measurement subframe sets are not configured.<br>In TM1-9, the CQI table for each subframe set is configured by parameter "CQI table configuration for csi-MeasSubframeSetx-r10 of serving cell c" instead if Rel-11 subframe set is configured. This parameter then instead indicates only the MCS table that shall be used for both subframe sets. |
| CQI table configuration for csi-MeasSubframeSet1-r10 of serving cell c | CQI table configuration for csi-MeasSubframeSet1-r10 of serving cell c | For csi-MeasSubframeSet1-r10 of serving cell c, when TM1-9 is configured, configures which CQI table is used between (7.2.3-1: 4-bit CQI Table) and the CQI tables for 256QAM. |
| CQI table configuration for csi-MeasSubframeSet2-r10 of serving cell c | CQI table configuration for csi-MeasSubframeSet2-r10 of serving cell c | For csi-MeasSubframeSet2-r10 of serving cell c, when TM1-9 is configured, configures which CQI table is used between (7.2.3-1: 4-bit CQI Table) and the CQI tables for 256QAM. |

TABLE 5

Embodiment 1 RRC configuration parameters (alternative 1)

| Parameter name in specification | Parameter name in text | Description |
| --- | --- | --- |
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM for TM10 and TM1-9 when measurement subframe sets are not configured. |
| MCS/CQI table configuration for csi-MeasSubframeSet1-r10 of serving cell c | MCS/CQI table configuration for csi-MeasSubframeSet1-r10 of serving cell c | For csi-MeasSubframeSet1-r10 of serving cell c, when TM1-9 is configured, configures which CQI table is used. If either csi-MeasSubframeSet1-r10 or csi-MeasSubframeSet2-r10 is configured with the 256QAM CQI table the UE is configured to use the MCS table corresponding to 256QAM (for certain DCI formats, RNTIs and search spaces) for all the subframes. |
| MCS/CQI table configuration for csi-MeasSubframeSet2-r10 of serving cell c | MCS/CQI table configuration for csi-MeasSubframeSet2-r10 of serving cell c | For csi-MeasSubframeSet2-r10 of serving cell c, when TM1-9 is configured, configures which CQI table is used. If either csi-MeasSubframeSet1-r10 or csi-MeasSubframeSet2-r10 is configured with the 256QAM CQI table the UE is configured to use the MCS table corresponding to 256QAM (for certain DCI formats, RNTIs and search spaces) for all the subframes. |

In embodiment 2, only 2 RRC parameters are defined as shown in Table 6. The first parameter "MCS/CQI table configuration for serving cell c" is used for general MCS/CQI table configuration in TM10 and TM1-9 without configuration of measurement subframe set for the UE, providing a first table indication parameter referring to a first set of alternative tables. When measurement subframe set is configured for TM1-9, the first parameter is used to configure the CQI table for csi-MeasSubframeSet1-r10 and the second parameter "CQI table configuration for csi-MeasSubframeSet2-r10 of serving cell c" configures CQI table for csi-MeasSubframeSet2-r10.

Accordingly, second and third table indication parameters may be used, whereas as a pre-determined default is assumed regarding the first set of alternative tables referring to the general MCS/CQI table. In this example, all the parameters are defined as OPTIONAL. Two parameters are signaled when measurement subframe set is configured in TM1-9, the parameters referring to second and third tables, and only the first parameter is signaled for the other cases, referring to a first table.

Similar to embodiment 1, there are a few examples given here how MCS table is determined when measurement subframe sets are configured in TM1-9.

In a first example the MCS table to apply for a specific set of DCI formats, RNTIs and (E)PDCCH search spaces are given by the configuration of the first parameter, i.e. the parameter "MCS/CQI table configuration for serving cell c". The MCS table configuration is applied for all subframes, i.e. not dependent on which measurement subframe set they belong to. However the CQI table to be used is separately configured per measurement subframe set.

In a second example the UE would use the 256QAM MCS table for a specific set of DCI formats, RNTIs and (E)PDCCH search spaces are if either the first or second parameter is configured with the 256QAM CQI table. If both parameters are configured with legacy CQI table then the legacy MCS table is used. The MCS table configuration is applied for all subframes, i.e. not dependent on which measurement subframe set they belong to. However the CQI table to be used is separately configured per measurement subframe set.

In a third example the UE would use the 256QAM MCS table for the subframes belong to a specific measurement subframe set and for a specific set of DCI formats, RNTIs and (E)PDCCH search spaces if the 256QAM CQI table is configured for that measurement subframe set.

All the three alternatives are shown in the below tables

TABLE 6

Embodiment 2 RRC configuration parameters (alternative 1)

| Parameter name in specification | Parameter name in text | Description |
| --- | --- | --- |
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM for TM10 and TM1-9 when measurement subframe sets are not configured. If measurement subframe sets are configured in TM1-9. The parameter gives the CQI table to apply for the first measurement subframe set and it further indicates MCS table to apply for the subframes belonging to the first and second measurement subframe set. |
| CQI table configuration for csi-MeasSubframeSet2-r10 of serving cell c | CQI table configuration for csi-MeasSubframeSet2-r10 of serving cell c | The parameter indicates whether or not to use the 256QAM CQI table or the legacy CQI table for serving cell c and TM1-9 for the second measurement subframe set, i.e. csi-MeasSubframeSet2-r10. |

TABLE 7

Embodiment 2 RRC configuration parameters (alternative 2)

| Parameter name in specification | Parameter name in text | Description |
| --- | --- | --- |
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM for TM10 and TM1-9 when measurement subframe sets are not configured. If measurement subframe sets are configured in TM1-9, the parameter gives the CQI table to apply for the first measurement subframe set. If either the first or second measurement subframe set is configured with the 256QAM CQI table the UE will use the 256QAM MCS table for all subframes for specific DCI formats, RNTIs and (E)PDCCH search spaces. |

TABLE 7-continued

Embodiment 2 RRC configuration parameters (alternative 2)

| Parameter name in specification | Parameter name in text | Description |
|---|---|---|
| CQI table configuration for csi-MeasSubframeSet2-r10 of serving cell c | CQI table configuration for csi-MeasSubframeSet2-r10 of serving cell c | The parameter indicates whether or not to use the 256QAM CQI table or the legacy CQI table for serving cell c in TM1-9 for the second measurement subframe set, i.e. csi-MeasSubframeSet2-r10. If either the first or second measurement subframe set is configured with the 256QAM CQI table the UE will use the 256QAM MCS table for all subframes for specific DCI formats, RNTIs and (E)PDCCH search spaces. |

TABLE 8

Embodiment 2 RRC configuration parameters (alternative 3)

| Parameter name in specification | Parameter name in text | Description |
|---|---|---|
| MCS/CQI table configuration for serving cell c | MCS/CQI table configuration for serving cell c | Configures which MCS/CQI table is used between (7.1.7.1-1: Modulation and TBS index table for PDSCH, 7.2.3-1: 4-bit CQI Table) and the MCS/CQI tables for 256QAM for TM10 and TM1-9 when measurement subframe sets are not configured. If measurement subframe sets are configured in TM1-9, the parameter gives the CQI/MCS table to apply for the first measurement subframe set. If the 256QAM MCS/CQI table is configured, 256QAM MCS table is only used for the subframe belonging to the first measurement subframe set and for specific DCI formats, RNTIs and (E)PDCCH search spaces. |
| CQI table configuration for csi-MeasSubframeSet2-r10 of serving cell c | MCS/CQI table configuration for csi-MeasSubframeSet2-r10 of serving cell c | The parameter indicates whether or not to use the 256QAM CQI table or the legacy CQI table for serving cell c and TM1-9 for the second measurement subframe set, i.e. csi-MeasSubframeSet2-r10. If measurement subframe sets are configured in TM1-9. The parameter gives the CQI/MCS table to apply for the second measurement subframe set. If the 256QAM MCS/CQI table is configured, 256QAM MCS table is only used for the subframe belonging to the second measurement subframe set and for specific DCI formats, RNTIs and (E)PDCCH search spaces. |

For both embodiments 1 and 2 it is given that if a specific parameter configures MCS table for both measurement subframe sets and at the same time configures the CQI table for one of the measurement subframe set. This measurement subframe set can be either measurement subframe set 1 or 2. It is further given that each parameter listed below can be a unique parameter per serving cell or be valid across serving cells.

There is generally described a terminal or UE for a wireless communication network. The terminal or UE may be adapted to be able to access and/or store one or more tables. A terminal or user equipment may generally be adapted for receiving a control message, in particular a RRC, for example in the context of LTE/E-UTRAN. A terminal or user equipment (UE) may generally be a device configured for wireless device-to-device communication and/or a terminal for a wireless and/or cellular network, in particular a mobile terminal, for example a mobile phone, smart phone, tablet, PDA, etc. It may be considered that a terminal or user equipment comprises radio circuitry and/or control circuitry for wireless communication. Radio circuitry may comprise for example a receiver device and/or transmitter device and/or transceiver device.

Control circuitry may include a controller, which may comprise a microprocessor and/or microcontroller and/or FPGA (Field-Programmable Gate Array) device and/or ASIC (Application-Specific Integrated Circuit) device. It may be considered that control circuitry comprises or may be connected or connectable to memory, which may be adapted to be accessible for reading and/or writing by the controller and/or control circuitry. It may be considered that a user equipment is configured to be a user equipment adapted for LTE/E-UTRAN. Control circuitry may be adapted to extract, from a received control message, one or more table indication parameters and/or to choose and/or access and/or read at least one table of at least one set of tables, in particular based on the one or more table indication parameters. Radio circuitry and/or control circuitry may be adapted to receive a control message.

A table may be stored in a memory of the terminal or UE, which may be accessible, in particular for reading, for control circuitry or a controller of the terminal or UE. A table may generally indicate information regarding modulation and/or a configuration for a mode, in particular a transmission mode and/or reception mode of the terminal. It may be envisioned that a table is indexed such that an index is linked or associated to an indication or parameter referring an aspect of the mode, for example to modulation and/or configuration for the mode, in particular regarding parameters pertaining to channel quality parameters and/or their transmission, in particular to a base station. It may be envisioned that the terminal or UE is adapted to access and/or store different alternative tables regarding at least one common or same aspect or the same aspects of modulation or configuration of a mode. The alternative tables may have the same size and/or number of indexed fields or may be implemented such that they have different sizes and/or numbers of indexed fields. An aspect may refer to the modulation scheme to be used, for example different variants of QAM. A corresponding table may be implemented as MCS table.

Alternative tables of this aspect may differ regarding their granularity and/or the different variants of modulation indexed and/or to be used or usable. For example, an alternative second table may include QAM with higher points and/or larger bit rate than a first table. Another aspect may refer to channel quality information and/or setup for transmission of related information and/or parameters. For example, this aspect may refer to CSI and/or a measurement subframe set and/or its setup.

A table may generally be stored in a memory accessible and/or accessed by the terminal or UE or an associated control circuitry or controller, in particular for read access and/or reading or retrieving a parameter and/or table entry, in particular based on an index. An index for reading or retrieving may be obtainable and/or receivable by the terminal or UE and/or associated control circuitry from a memory and/or by receiving a message, for example a control message.

A terminal or user equipment generally may comprise and/or store and/or be adapted to access at least one set of at least two alternative tables; each table in a set of table may be related to at least one common aspect and/or the same aspect. A set of alternative tables may for example comprise one table related to legacy or earlier standard version of a table, and a table related to a later standard version.

It may be considered that a first set of tables comprises at least two tables comprising differently indexed and/or different modulation schemes and/or different MCS tables. There may be provided a second set of tables, which may comprise different tables regarding CQI, in particular a first measurement subframe set, e.g. as indicated above with regards to LTE. There may be provided a third set of tables, which may comprise different tables regarding a different CQI aspect, in particular a second measurement subframe set, e.g. as indicated above with regards to LTE. Generally, a provided set of tables may be stored in a memory of the terminal or UE and/or accessible to or accessed by a terminal or UE. A terminal or UE may be adapted to receive a control message, in particular from a base station or eNB, and/or to extract, from a control message, one or more table indication parameters. It may be conceived that the terminal or UE is adapted to choose and/or determine, from one or more sets of alternative tables, based on the control message and/or the table indication parameter or parameters, which table or tables from the one or more set of alternative tables to access and/or to read.

Alternatively or additionally, it may be adapted to access and/or read from at least one table, in particular one of a set of alternative tables and/or more than one table, each table being one of a table in a set of alternative tables, based on the control message and/or at least one table indication parameter of the control message, which may comprise an indication and/or information and/or one or more parameters indicating at least one table to be used from at least one set of alternative tables and/or index parameters allowing accessing and/or reading and/or indexing the respective table. The terminal or UE may be adapted to perform a modulation configuration based on the table and/or based on information retrieved or read from the table.

A control message may generally be a message receivable or received by a terminal or user equipment, e.g. from a base station, and/or transmittable or transmitted by a base station, e.g. to a user equipment. The control message may generally comprise information and/or one or more parameters for controlling a user equipment, in particular information and/or one or more parameters indicating a table of a set of at least two alternative tables to be used, in particular by the user equipment. The parameters may include one or more table indication parameters, for example bit-value parameters. The value of a table indication parameter may generally indicate which table the terminal or user equipment is supposed to use. The number of table indication parameters may be variable and/or dependent on the tables to be used and/or the transmission modes and/or modulation scheme to be used.

Generally, there may be a table indication parameter associated to each set of alternative tables. The table indication parameter may be adapted to be able to indicate, in particular to indicate unambiguously, which table of a set to use, in particular in regards to it bit-size. For example, if a set of tables comprises two tables, a 1-bit parameter may be sufficient. Generally, the control message and/or the number of table indication parameters and/or their respective values may be determined and/or configured and/or provided and/or transmitted by a base station. Determining the control message and/or the number of table indication parameters and/or their respective values may be performed by a control message determination unit or device. The control message may include one or more parameters indicating an indexed item or information to retrieve from one or more tables to be read from. Transmitting the control message may be performed by a transmission unit or device. Control message determination unit or device and/or transmission unit or device may be implemented in and/or on a base station, e.g. in software and/or hardware and/or firmware, in particular utilizing control circuitry and/or a memory of the base station.

In one general variant, the control message may comprise a first table indication parameter indicating a table from a first set of alternative tables, in particular alternative MCS tables. In the first mode, the control message may comprise only one table indication parameter and/or merely an MCS table indication parameter and/or the number of table indication parameters may be one. Other tables may be accessed or not accessed according to a pre-defined default. Depending on the transmission mode and/or the modulation scheme used and/or depending on whether and/or which CSI scheme or measurement subframe set setup is to be used, the control message, in a second mode, may comprise a second table indication parameter or a second and a third table indication parameter.

It may be contemplated that, e.g. to indicate that the same CSI scheme and/or measurement subframe set setup is to be used for each of two measurement subframe sets, the control message may comprise the first table indication parameter and a second table indication parameter, wherein the second table indication parameter may indicate a second and/or third table to be used and/or being associated to respective tables, for example second and third tables as outlined above. This may be in the context of a second mode, wherein the number of table indication parameters may be two.

As an alternative, there may be provided two parameters including a the second table indication parameter and a third table indication parameter, which may refer to a second set of alternative tables, respectively configurations of two aspects, e.g. two measurement subframe sets, and/or associated table accesses to the same table, and/or a second set of alternative tables and a third set of alternative tables. In this case, the terminal may assume a default configuration regarding the first set of alternative tables, e.g. regarding MCS configuration. The two measurement subframe sets may be configured or set up based on the two table indication parameters pertaining to the second set of tables, if the subframe sets use the same set of tables, and/or the second and third set of tables, if the different subframe sets use different sets of tables.

The second table may in one example be used for both measurement subframe sets, instead of using a second and a third table; thus, the second table indication parameter may indicate a second table access, and optionally, a third table access—which may or may not be performed, as it may be more efficient to access the second table only once and use the value retrieved for both subframe sets. In such an example of the second mode, the control message may comprise exactly two table indication parameters.

In a different example of a second mode, or in a third mode in addition to the above second mode, e.g. if different setups are to be used for CSI and/or two measurement subframe sets, the control message may comprise, next to a first table indication parameter, a second table indication parameter and a third table indication parameter, wherein the second table indication parameter may be associated to a second table and the third table indication parameter may be associated to a third table, e.g. the second and third tables discussed above. In these modes, the number of table indication parameters may be three. This may be used as a second mode even for cases in which the second and third tables are used identically, to provide a simple control message configuration and definition and/or to more clearly distinguish the different modes by the number of parameters used.

In a second variant, the control message, in a first mode, may comprise a first table indication parameter associated to a first set of alternative tables, e.g. related to MCS. The number of table indication parameters in this mode may be one. In a second mode, there may be provided, instead of a first table indication parameter, a second table indication parameter and a third table indication parameter associated to a second set of alternative tables and a third set of alternative tables. The first set of alternative tables may be accessed and/or used or not used according to a pre-defined default. In this second mode, the number of table indication parameters may be two. This variant allows something similar to a variable overload, as the interpretation of a bit representing a first table indication parameter in the first mode would change in the second mode.

The control message may be adapted according to the first variant (embodiment 1 above may be considered an example of this variant, e.g. tables 4 and 5 and related text) or the second variant (embodiment 2 above may be considered an example of this variant, see e.g. tables 6 to 8 and related text).

According to an independent variant, the control message may comprise table indication parameters as discussed regarding embodiment 1 or 2, in particular as disclosed in the corresponding tables.

Generally, instead of having two sets of tables for related information, e.g. measurement subframe set setup, it may be contemplated to only use one set of tables and perform one access or two accesses to the table, e.g. to set up the measurement subframe sets if they are to be configured in the same way, or two accesses to the same table, e.g. to set up the measurement subframe sets if they are to be configured differently.

Signaling configuration information may generally comprise sending and/or receiving and/or determining a control message as outlined herein. Performing modulation configuration may generally refer to setting a terminal into a mode in which it used the modulation mode configured, in particular in regards to the type of QAM used and/or measurement subframe sets.

There may be envisioned a base station adapted to transmit, in particular to a terminal or user equipment, a control message, e.g. a RRC message. It may be considered that the base station is adapted to determine the control message and/or the number of table indication parameters and/or at least one table indication parameter and/or an associated value to be included into the message and/or to be transmitted, e.g. based on transmission mode to be used by the terminal, e.g. transmission mode TM10 or TM 1-9 and/or related measurement subframe sets, and/or characteristics of transmission and/or reception and/or operative characteristics of the communication with the terminal or UE, e.g. channel quality information. The base station may be adapted to include, into the control message, one or more than one table indication parameters, which may be part of determining the control message. The base station may comprise any one or any combination of features described herein.

There may be envisioned a terminal being adapted to receive, in particular from a base station, a control message. The terminal may be adapted to choose and/or read from and/or access at least one table of at least one set of alternative tables based on the control message. It may be considered that the terminal is adapted to perform modulation configuration based on information and/or at least on parameter retrieved and/or read from the at least one table. The terminal may comprise any one or any combination of features as discussed herein. A terminal or UE may be adapted to receive the control message and/or to determine the mode of the control message and/or the number of table indication parameters to be expected, e.g. based on one or more parameters of the control message and/or separate signaling and/or the length of the control message and/or the number of parameters, in particular of table indication parameters, in the control message. The mode of the control message may refer to the modes of the different variants of control messages discussed above.

There may be considered a method, in particular in a wireless communication network, for signaling modulation configuration. The method may comprise determining and/or transmitting, in particular by a base station, which may be part of the network, a control message, in particular a control message as discussed herein.

The control message may be received, e.g., by a terminal and/or a reception unit or device. At least one table of at least one set of alternative tables may be read from and/or accessed based on the control message and/or one or more table indication parameters included therein, e.g. by the terminal and/or a reading or accessing unit. The control message may be evaluated, e.g. by an evaluation unit or device, to determine which table to read from and/or to retrieve an indexed parameter or information from the at least one table. Optionally, signaling configuration, e.g. of the terminal, may be performed based on information retrieved from the at least one table, e.g. by a configuration device or unit.

There may be considered a method for signaling modulation configuration, which may be performed by a base station. The method may comprise determining and/or transmitting, in particular by a base station, which may be part of a wireless communication network, a control message, in particular a control message as discussed herein. The control message may be transmitted to a terminal.

There may also be considered a method for signaling modulation configuration, which may be performed by a terminal. A control message may be received, e.g., by a terminal and/or a reception unit or device. At least one table of at least one set of alternative tables may be read from and/or accessed based on the control message and/or one or more table indication parameters included therein, e.g. by the terminal and/or a reading or accessing unit. The control message may be evaluated, e.g. by an evaluation unit or device, to determine which table to read from and/or to retrieve an indexed parameter or information from the at least one table. Optionally, signaling configuration, e.g. of the terminal, may be performed based on information retrieved from the at least one table, e.g. by a configuration device or unit.

A reception unit or device and/or evaluation unit or device and/or reading or accessing unit or device and/or configuration device or unit may be implemented in or on a terminal, e.g. in software and/or hardware and/or firmware, in particular utilizing control circuitry and/or a memory of the terminal.

In the context of this specification, wireless communication may be communication, in particular transmission and/or reception of data, via electromagnetic waves, in particular radio waves, e.g. utilizing a radio access technology (RAT). The communication may be between members or nodes of a wireless communication network. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header.

Each node involved in communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller or processing arrangement and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hard-wired and/or provided as firmware and/or software and/or in hardware. A controller may generally comprise a processor and/or microprocessor and/or microcontroller and/or FPGA (Field-Programmable Gate Array) device and/or ASIC (Application-Specific Integrated Circuit) device.

More specifically, it may be considered that control circuitry comprises or may be connected or connectable to memory, which may be adapted to be accessible for reading and/or writing by the controller and/or control circuitry. Radio access technology may generally comprise GERAN and/or UTRAN and/or in particular E-UTRAN and/or LTE. A communication may in particular comprise a physical layer (PHY) transmission and/or reception, onto which logical channels and/or logical transmission and/or receptions may be imprinted or layered.

A base station may be any kind of base station of a wireless and/or cellular network adapted to serve one or more user equipments. A base station may be adapted to provide and/or define one or more cells of the network. It may be considered that a base station comprises radio circuitry and/control circuitry for wireless communication. Control circuitry may be adapted to determine a control message and/or the number and/or values of table indication parameters; control and/or radio circuitry may be adapted for transmitting in particular the control message. Radio circuitry may comprise for example a receiver device and/or transmitter device and/or transceiver device.

Control circuitry may include a controller, which may comprise a microprocessor and/or microcontroller and/or FPGA (Field-Programmable Gate Array) device and/or ASIC (Application-Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in wireless communication.

Generally, a base station may be arranged to communicate with a core network and/or to provide services and/or control to one or more user equipments and/or to relay and/or transport communications and/or data between one or more user equipments and a core network and/or another base station. An eNodeB (eNB) may be envisioned as a base station, in particular as a base station according to LTE. It may be considered that a base station such as an eNB is configured as or connected or connectable to an Evolved Packet Core (EPC) and/or to provide and/or connect to corresponding functionality. The functionality and/or multiple different functions of a base station may be distributed over one or more different devices and/or physical locations. A base station may be considered to be a node of a wireless communication network.

A storage medium may be any kind of medium suitable to store instructions readable by control circuitry, e.g. a random-access memory and/or flash memory and/or non-volatile memory and/or optical storage medium like a CD or DVD and/or hard disk.

Some Abbreviations used are:
QAM Quadrature Amplitude Modulation, a modulation scheme
3GPP 3rd Generation Partnership Project CQI Channel Quality Indication
CSI Channel State Information
MCS Modulation and Coding Scheme; indicated by a corresponding table (see table 2)
UE User Equipment; a terminal for a wireless network
eNB eNodeB; evolved Node B; a base station for a wireless network (LTE)
RRC Radio Resource Control
QPSK Quadrature Phase Shift Keying, a modulation scheme
16QAM 16 point QAM
32QAM 32 point QAM
64QAM 64 point QAM
256QAM 256 point QAM
SINR/SNR Signal-to-Interference and Noise Ratio; Signal-to-Noise Ratio
TBS Transfer Block Size
TM Transmission Mode
TM10 Transmission Mode 10; according to LTE
TM1-9 Transmission Modes 1-9; according to LTE
LTE Long Term Evolution; a wireless communication standard
E-Utran Evolved UMTS terrestrial radio network access network; RAT according to LTE
RAT Radio Access Technology FIG. 1 schematically shows a terminal or user equipment 10, which may be a node of a wireless communication network, in closer detail. User equipment 10 comprises control circuitry 20, which may comprise a controller connected to a memory. A reception unit or device and/or evaluation unit or device and/or reading or accessing unit or device and/or configuration device or unit may be implemented in the control circuitry 20, in particular as unit in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for wireless communication, in particular utilizing E-UTRAN/LTE as described herein. In particular, they are arranged for receiving a control message, e.g. a RRC message, and to read from one or more tables depending on table indication parameters as described herein, in particular in reference to tables 4 to 8.

Figure 2:
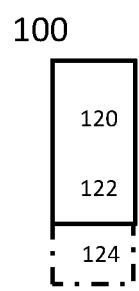
FIG. 2 schematically shows a base station.

FIG. 2 schematically shows a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises one or more of the devices or units described herein. An antenna circuitry 124 may be connected or connectable to radio circuitry 122 to provide good signal reception or transmittance and/or amplification.

Figures 3, 4:
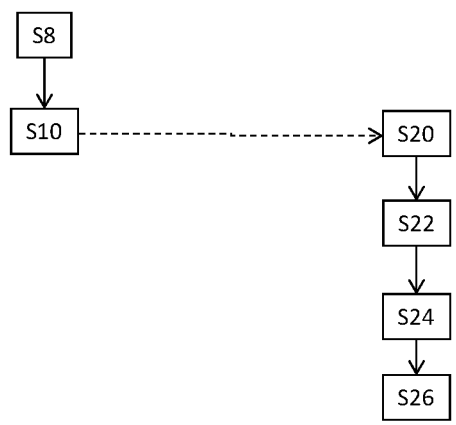
FIGS. 3 and 4 show methods for signal configuration in schematic flowcharts.

FIGS. 3 and 4 show different example methods and unit configurations. In S8, a control message determination unit of a base station may determine a control message, in particular one or more table indication parameters to be utilized, which may be performed based on channel quality information and/or operative conditions like transmission or reception characteristics. In S10, a transmitting unit of the base station may transmit the control message, in particular to a user equipment or terminal. In S20, the terminal or a reception unit of the terminal, may receive the control message. In S22, an evaluation unit may evaluate the control message, in particular determine and/or extract one or more table indication parameters. In S24, one or more tables of one or more sets of tables may be accessed and or read, in particular by a reading unit of the terminal, based on the table indication parameters. In particular, the terminal may choose one table of each set of alternative tables to read from based on the one or more table indication parameters, which refer to a set of alternative tables each. In S26, the terminal or a configuration unit of the terminal performs modulation configuration based on information retrieved by accessing the one or more tables in S24.

It should be noted that generally, the devices or units of a base station or user equipment discussed herein may be implemented as modules, in particular as software modules or at least partly as software modules. Functionality of more than one module may be implemented in a common module or module arrangement.

Generally, a set of alternative tables may comprise two or more tables, from which one may be chosen, e.g. for reading. This choice may be exclusive, so that for a given read access to a set of alternative tables only one table is chosen to be read from. Configuring a table, in particular from a set of alternative tables, may be considered to be choosing the table and/or selecting the table, e.g. for reading.

A set of alternative tables for CQI and/or CSI may comprise a set of alternative tables pertaining to measurement sets to be used, in particular pertaining to CQI/CSI parameters. It may be considered that more than one measurement set may be used and/or configured. A measurement set may e.g. define the frequency for and/or timing of and/or type of measurements and/or related reports to be made (in particular by a terminal and/or UE), and/or transmission format/s for reports on measurements, and/or modulation and/or coding to be used. A corresponding table may provide indications and/or values for such a measurement set, in particular a set indexed alternatives.

Generally, which table to be chosen from a set of alternative tables may be dependent on further conditions, in particular cell conditions and/or transmission mode and/or transmission format, e.g. DCI (Downlink Control Information) format and/or RNTI (Radio Network Temporary Identifier, an identifier for a terminal/UE in a network) and/or channel conditions, e.g. search spaces on an (E)PDCCH ((Enhanced) Physical Downlink Control Channel).

Operating with a table from a set of alternative tables may imply choosing this table and/or reading from this table. Operating with a specific MCS table may refer to choosing a modulation configuration from this table and/or reading a modulation configuration from this table, and/or performing modulation and/or modulating transmission signals based on this table.

A modulation and/or modulation configuration and/or MCS may refer to and/or indicate a modulation scheme and/or modulation parameters, e.g. bits/symbol and/or bit transfer rate and/or whether to use QAM or nor and/or which QAM to use, e.g. 16QAM, 32QAM, 64QAM, 128QAM and/or 256QAM, in particular the latter. A modulation and/or modulation configuration may additionally pertain to a coding to be used, e.g. for error detection and/or error correction. A table pertaining to modulation and/or MCS may generally indicate settings and/or values and/or parameters for a plurality of such modulations and/or modulation configurations and/or MCS (schemes), one of which may be chosen by reading from the table, e.g. based on an index.

Performing modulation configuration, e.g. based on a table, may comprise configuring for modulation based on values read from the table and/or setting modulation parameters based on the table and/or based on values read from the table. It may in particular comprise choosing and/or reading a modulation and/or modulation setting and/or parameters from the table and/or from values in the table. Performing modulation may comprise modulation configuration and/or transmitting data and/or signals based on and/or utilizing the modulation configuration scheme configured.

A method for a device (like a terminal or base station) may generally be a method for operating the device and/or a method performed by the device (and/or individual components and/or units of the device).

What is claimed is:

1. A terminal for a wireless network, the terminal being configured to:
   receive a control message;
   read from one of a set of alternative tables based on the control message;
   operate with a 256QAM MCS table, if one of a first and second measurement sets is configured with a 256QAM CQI table; and
   perform modulation configuration based on information read from the table.

2. The terminal according to claim 1, wherein the set of alternative tables refers to different modulation schemes.

3. The terminal according to claim 2, wherein the control message comprises a parameter configuring a MCS table for both of two measurement subframe sets and at the same time configuring a CQI table for one of the measurement subframe sets.

4. The terminal according to claim 1, wherein the control message comprises a parameter configuring a MCS table for both of two measurement subframe sets and at the same time configuring a CQI table for one of the measurement subframe sets.

5. A method for a terminal for a wireless network, the method comprising:
   receiving a control message;
   reading from one of a set of alternative tables based on the control message;
   operating with a 256QAM MCS table, if one of a first and second measurement sets is configured with a 256QAM CQI table and
   performing modulation configuration based on information read from the table.

6. The method according to claim 5, wherein the set of alternative tables refers to different modulation schemes.

7. The method according to claim 6, wherein the control message comprises a parameter configuring a MCS table for both of two measurement subframe sets and at the same time configuring a CQI table for one of the measurement subframe sets.

8. The method according to claim 5, wherein the control message comprises a parameter configuring a MCS table for both of two measurement subframe sets and at the same time configuring a CQI table for one of the measurement subframe sets.

9. A base station for a wireless network, the base station being configured to:
   determine a control message; transmit the control message to a terminal; and
   the control message comprising information indicating a table of a set of alternative tables to be used, and the control message being adapted for configuring the terminal for operating with a 256QAM MCS table, if one of a first and second measurement sets is configured with a 256QAM CQI table.

10. The base station according to claim 9, wherein the set of alternative tables refers to different modulation schemes.

11. The base station according to claim 10, wherein the control message comprises a parameter configuring a MCS table for both of two measurement subframe sets and at the same time configuring a CQI table for one of the measurement subframe sets.

12. The base station according to claim 9, wherein the control message comprises a parameter configuring a MCS table for both of two measurement subframe sets and at the same time configuring a CQI table for one of the measurement subframe sets.

* * * * *

UNITED STATES PATENT AND TRADEMARK OFFICE
CERTIFICATE OF CORRECTION

PATENT NO. : 10,616,029 B2
APPLICATION NO. : 16/214721
DATED : April 7, 2020
INVENTOR(S) : Larsson et al.

It is certified that error appears in the above-identified patent and that said Letters Patent is hereby corrected as shown below:

On the Title Page

Item (63), under "Related U.S. Application Data", in Column 1, Line 2, delete "2017," and insert -- 2017, now Pat. No. 10,200,230, --, therefor.

In the Specification

In Column 1, Line 9, delete "CONFIGURATION," and insert -- CONFIGURATION, now Pat. No. 10,200,230, --, therefor.

In Column 1, Line 11, delete "2015," and insert -- 2017, now Pat. No. 9,621,397, --, therefor.

In Column 1, Line 33, delete "Re1-8" and insert -- Rel-8 --, therefor.

In Column 1, Line 36, delete "Re1-8" and insert -- Rel-8 --, therefor.

In Column 2, Line 65, delete "Table" and insert -- Table 1 --, therefor.

In Column 2, Line 66, delete "Re1-8" and insert -- Rel-8 --, therefor.

In Column 3, Line 6, delete "Re1-8" and insert -- Rel-8 --, therefor.

In Column 3, Line 19, delete "sufficient" and insert -- sufficient. --, therefor.

In Column 3, Line 23, delete "table accesses" and insert -- table access --, therefor.

In Column 4, Line 47, delete "need to tested," and insert -- need to be tested, --, therefor.

In Column 4, Line 50, delete "for is shown" and insert -- is shown --, therefor.

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,616,029 B2

In Column 5, Line 38, delete "terminal further may further" and insert -- terminal further may --, therefor.

In Column 8, Line 18, delete "Wi Fi," and insert -- WiFi, --, therefor.

In Column 17, Line 8, delete "including a the" and insert -- including the --, therefor.

In Column 21, Line 22, delete "radio network access" and insert -- radio access --, therefor.

In Column 22, Line 6, delete "and or" and insert -- and/or --, therefor.

In the Claims

In Column 24, Line 3, in Claim 5, delete "table and" and insert -- table; and --, therefor.

In Column 24, Lines 21-22, delete "transmit the control message to a terminal; and" and insert the same at Line 22, as a next sub-point.